(12) United States Patent
McKnight et al.

(10) Patent No.: US 7,854,467 B2
(45) Date of Patent: Dec. 21, 2010

(54) AIRFLOW CONTROL DEVICES BASED ON ACTIVE MATERIALS

(75) Inventors: Geoffrey P. McKnight, Los Angeles, CA (US); Cameron Massey, Hawthorne, CA (US); Guillermo A. Herrera, Winnetka, CA (US); William Barvosa-Carter, Ventura, CA (US); Nancy L. Johnson, Northville, MI (US); Alan L. Browne, Grosse Pointe, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 12/174,035

(22) Filed: Jul. 16, 2008

(65) Prior Publication Data

US 2008/0272615 A1 Nov. 6, 2008

Related U.S. Application Data

(62) Division of application No. 11/086,469, filed on Nov. 5, 2004, now Pat. No. 7,429,074.

(51) Int. Cl.
*B60J 9/00* (2006.01)
(52) U.S. Cl. .................................. 296/180.1
(58) Field of Classification Search ............. 296/180.1, 296/180.5
See application file for complete search history.

(56) References Cited

U.S. PATENT DOCUMENTS

| | | | |
|---|---|---|---|
| 2,184,798 A | 12/1939 | Gracey | 296/91 |
| 3,816,774 A * | 6/1974 | Ohnuki et al. | 310/332 |
| 4,052,099 A | 10/1977 | Lowery et al. | 296/91 |
| 4,119,339 A | 10/1978 | Heimburger | 296/180.5 |
| 4,131,308 A | 12/1978 | Holka et al. | 196/180.5 |
| 4,170,377 A | 10/1979 | Ingram | 296/180.5 |
| 4,460,213 A | 7/1984 | Janssen et al. | 296/180.5 |
| 4,489,806 A | 12/1984 | Shimomura | 296/180.5 |
| 4,558,897 A | 12/1985 | Okuyama et al. | 296/180.5 |
| 4,659,130 A | 4/1987 | Dimora et al. | 296/180.1 |
| 4,660,879 A * | 4/1987 | Kobayashi et al. | 296/180.5 |
| 4,674,788 A | 6/1987 | Ohmura et al. | 296/180.5 |
| 4,778,212 A | 10/1988 | Tomforde | 296/180.1 |
| 4,810,022 A | 3/1989 | Takagi et al. | 296/180.5 |
| 4,902,067 A | 2/1990 | Sakai et al. | 296/180.1 |
| 4,976,489 A | 12/1990 | Lovelace | 296/180.1 |
| 5,146,203 A | 9/1992 | Simuni | 296/180.1 |

(Continued)

*Primary Examiner*—Kiran B. Patel

(57) ABSTRACT

An airflow control device comprises a body and an active material in operative communication with the body. The active material, such as shape memory material, is operative to change at least one attribute in response to an activation signal. The active material can change its shape, dimensions and/or stiffness producing a change in at least one feature of the airflow control device such as shape, dimension, location, orientation, and/or stiffness to control vehicle airflow to better suit changes in driving conditions such as weather, ground clearance and speed, while reducing maintenance and the level of failure modes. As such, the device reduces vehicle damage due to inadequate ground clearance, while increasing vehicle stability and fuel economy. An activation device, controller and sensors may be employed to further control the change in at least one feature of the airflow control device such as shape, dimension, location, orientation, and/or stiffness of the device. A method for controlling vehicle airflow selectively introduces an activation signal to initiate a change of at least one feature of the device that can be reversed upon discontinuation of the activation signal.

7 Claims, 8 Drawing Sheets

U.S. PATENT DOCUMENTS

| | | | |
|---|---|---|---|
| 5,150,864 A * | 9/1992 | Roglin et al. | 244/219 |
| 5,292,166 A | 3/1994 | Emery | 296/180.5 |
| 5,454,619 A | 10/1995 | Haraway, Jr. | 296/180.1 |
| 5,558,304 A * | 9/1996 | Adams | 244/134 A |
| 5,632,841 A | 5/1997 | Hellbaum et al. | 156/245 |
| 5,662,294 A * | 9/1997 | Maclean et al. | 244/219 |
| 5,692,796 A | 12/1997 | Yamamoto et al. | 296/180.1 |
| 5,803,409 A * | 9/1998 | Keefe | 244/206 |
| 5,983,944 A * | 11/1999 | Niv | 137/831 |
| 5,988,568 A | 11/1999 | Drews | 296/180.1 |
| 6,033,010 A | 3/2000 | Preiss | 296/180.1 |
| 6,139,090 A | 10/2000 | Stidd | 296/180.5 |
| 6,174,025 B1 | 1/2001 | Henderson et al. | 296/217 |
| 6,196,620 B1 | 3/2001 | Haraway, Jr. | 296/180.5 |
| 6,209,947 B1 | 4/2001 | Rundels et al. | 296/180.1 |
| 6,236,139 B1 * | 5/2001 | Hill et al. | 310/307 |
| 6,378,932 B1 | 4/2002 | Fasel et al. | 296/180.5 |
| 6,409,749 B1 | 6/2002 | Maynard | 623/1.1 |
| 6,427,948 B1 * | 8/2002 | Campbell | 244/204.1 |
| 6,484,971 B2 * | 11/2002 | Layukallo | 244/130 |
| 6,520,564 B1 | 2/2003 | Liang | 296/180.5 |
| 6,712,425 B2 | 3/2004 | Brulhart | 296/180.1 |
| 6,833,656 B2 * | 12/2004 | Hooley et al. | 310/369 |
| 6,863,242 B2 * | 3/2005 | Van De Kreeke et al. | 244/7 R |
| 6,926,346 B1 * | 8/2005 | Wong et al. | 296/180.5 |
| 6,948,910 B2 * | 9/2005 | Polacsek | 416/1 |
| 6,979,050 B2 | 12/2005 | Browne et al. | 296/180.5 |
| 2004/0197519 A1 * | 10/2004 | Elzey et al. | 428/68 |
| 2005/0121240 A1 | 6/2005 | Aase et al. | 180/68.1 |
| 2005/0198907 A1 * | 9/2005 | McKnight et al. | 49/475.1 |

* cited by examiner

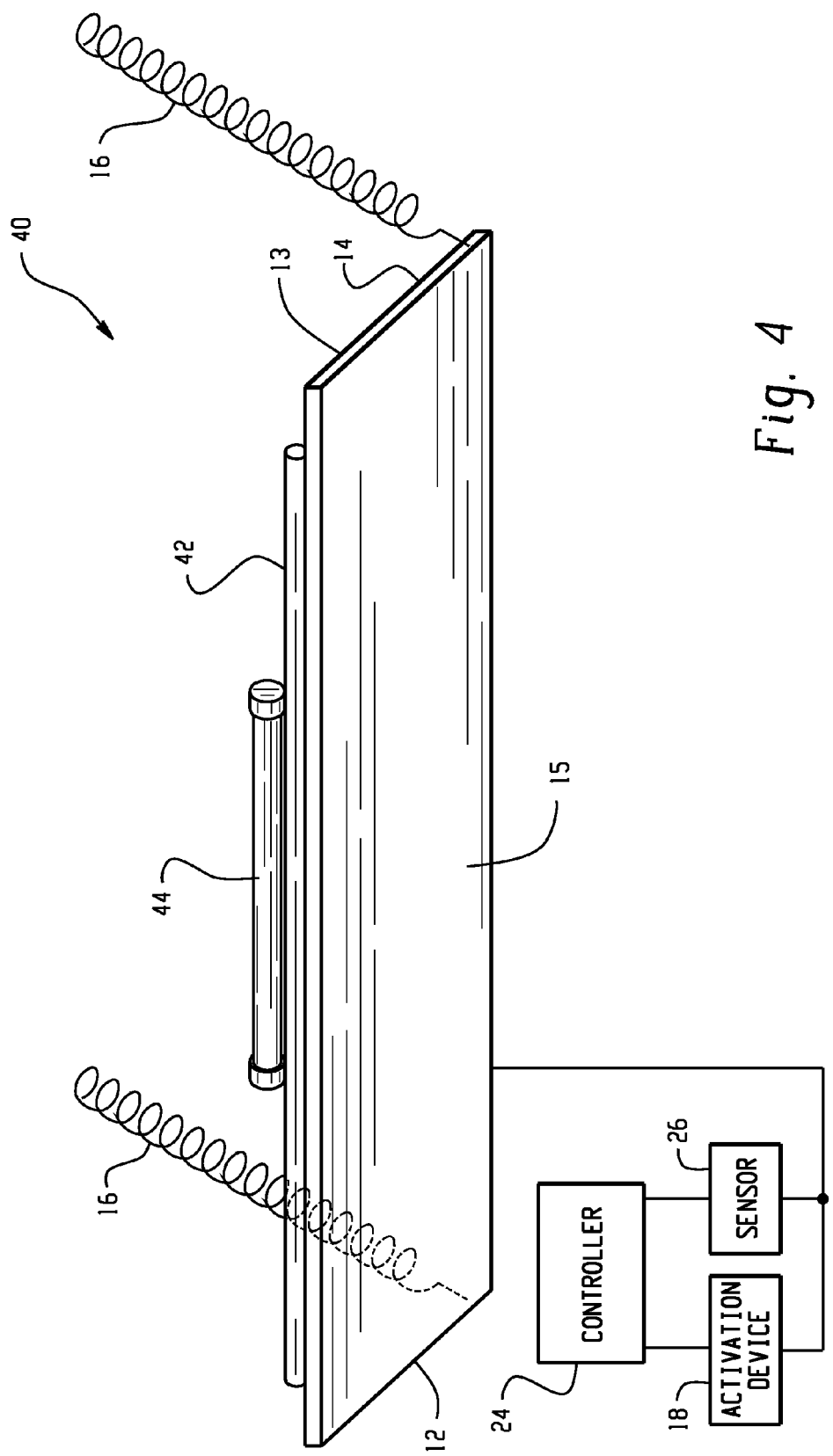

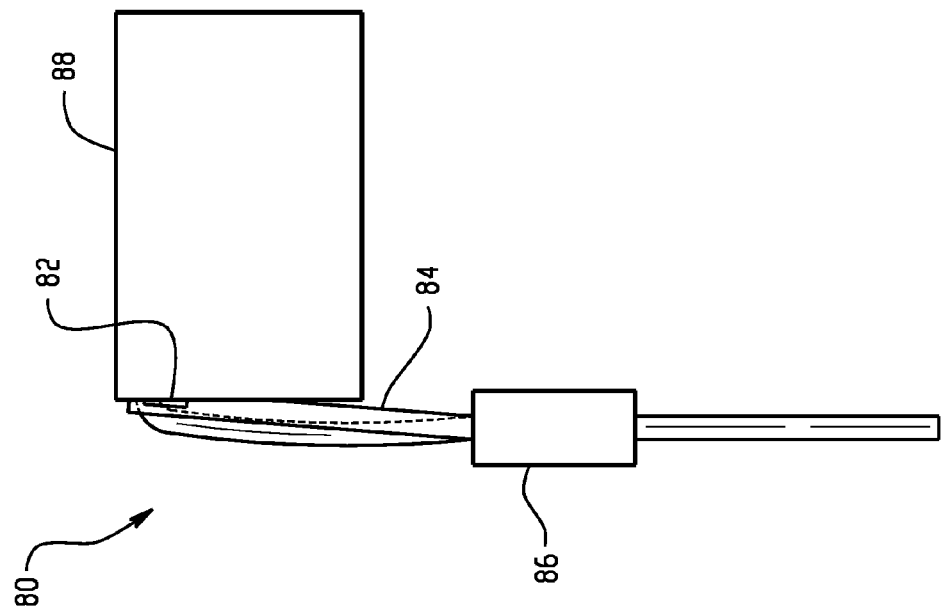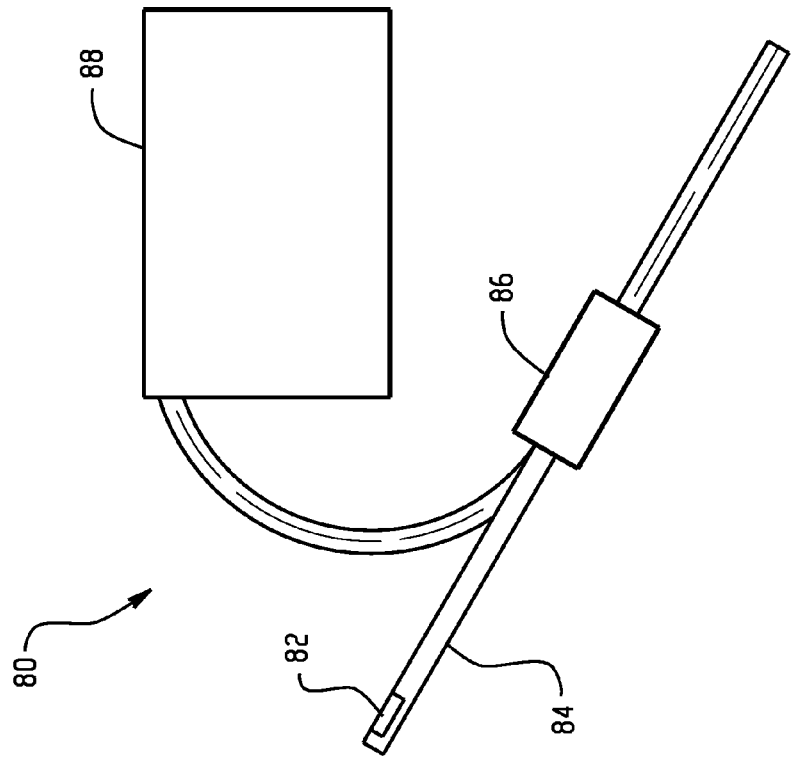
Fig. 9

AIRFLOW CONTROL DEVICES BASED ON ACTIVE MATERIALS

CROSS REFERENCE TO RELATED APPLICATIONS

The present application is a divisional of, and claims priority to, U.S. patent application Ser. No. 11/086,469, filed on Nov. 5, 2004, incorporated herein in its entirety.

BACKGROUND

The present disclosure relates to devices for controlling vehicle airflow and, more particularly, to devices for controlling vehicle airflow which can be adjusted through changes in active materials in response to varying conditions, the adjustment being affected through shape, dimension, and/or stiffness changes in the active material.

Airflow over, under, around, and/or through a vehicle can affect many aspects of vehicle performance including vehicle drag, vehicle lift and down force, and cooling/heat exchange for a vehicle powertrain and air conditioning systems. Reductions in vehicle drag improve fuel economy. Vehicle lift and downforce can affect vehicle stability and handling. As used herein, the term "airflow" refers to the motion of air around and through parts of a vehicle relative to either the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. The term "lift" as used herein refers to the component of the total force due to airflow relative to a vehicle acting on the vehicle in a vertically upward direction. The term "downforce" used herein refers to the component of total force due to airflow relative to the vehicle acting on a vehicle in a vertically downward direction.

Devices known in the art of vehicle manufacture to control airflow relative to a vehicle are generally of a predetermined, non-adjustable geometry, location, orientation and stiffness. Such devices generally do not adapt as driving conditions change, thus the airflow relative to the vehicle cannot be adjusted to better suit the changing driving conditions. Additionally, current under-vehicle airflow control devices can reduce ground clearance. Vehicle designers are faced with the challenge of controlling the airflow while maintaining sufficient ground clearance to avoid contact with and damage by parking ramps, parking blocks, potholes, curbs and the like. Further, inclement weather, such as deep snow slush or rainfall, can damage the device and/or impair vehicle handing.

Current stationary airflow control devices may be adjustable by mounting and/or connecting the devices to hydraulic, mechanical, electrical actuators and/or the like. For example, some vehicle spoilers may adjust location and/or orientation in response to an actuator signal. However, such actuators generally require additional components such as pistons, motors, solenoids and/or like mechanisms for activation, which increase the complexity of the device often resulting in increased failure modes, maintenance, and manufacturing costs. Therefore, there exists a need for an adjustable device for controlling vehicle airflow under varying driving conditions that enhances device simplicity while reducing device problems and the number of failure modes.

BRIEF SUMMARY

Disclosed herein is an airflow control device for a vehicle, i.e. air deflector. The air deflector comprises a body portion having at least one surface, and an active material in operative communication with the at least one surface, the active material being operative to change at least one attribute in response to an activation signal, wherein an airflow across the air deflector changes with the change in the at least one attribute of the active material.

Also disclosed is a system for controlling vehicle airflow comprising a stationary surface of a vehicle; and an air deflector fixedly attached to the stationary surface, the air deflector comprising an air deflecting body having at least one surface, an active material in operative communication with the at least one surface, the active material being operative to change a feature of the deflecting body in response to an activation signal, and an activation device in functional communication with the active material, the activation device being operable to selectively provide the activation signal, the activation signal initiates a change in at least one attribute of the active material, wherein the change in at least one attribute of the active material changes a feature of the air deflecting body.

A method for controlling vehicle airflow is also disclosed positioning an airflow controlling device on a stationary surface of the vehicle, the airflow controlling device comprising a body having at least one surface, and an active material in operative communication with the at least one surface, the active material being operative to change a at least one attribute in response to an activation signal; selectively introducing the activation signal upon meeting and/or exceeding a predetermined vehicle condition; and changing the at least one attribute of the active material from a first at least one attribute to a second at least one attribute.

In another embodiment, an air deflector for a vehicle comprises an active material comprising an elongated body having one end fixedly attached to a stationary surface, wherein the active material is adapted to change a flexural modulus property in response to an activation signal.

In yet another embodiment, an air deflector for a vehicle comprises a hinge comprising an active material adapted to hingingly communicate with a stationary surface, wherein the active material is adapted to change a flexural modulus property in response to an activation signal; and a rigid flap fixedly attached to the hinge.

A method of operating an air deflector comprises activating an active material to change at least one attribute of the active material, wherein the air deflector comprises an elongated body of the active material having one end fixedly attached to a stationary surface and an other end in an impinging airflow path, wherein the change in the at least one attribute changes a deflection angle of the air deflector.

The above described and other features are exemplified by the following figures and detailed description.

BRIEF DESCRIPTION OF THE DRAWINGS

Referring now to the figures, which are meant to be exemplary embodiments, and wherein the like elements are numbered alike:

FIG. 4 is a perspective view of an airflow control device wherein an active material is connected externally to the surface of the airflow control device in accordance with an embodiment of the present disclosure;

FIG. 9 is a perspective view of an airflow control device and latch mechanism in accordance with another embodiment.

DETAILED DESCRIPTION

The present disclosure provides an airflow control device for a vehicle 100 (FIG. 7), wherein the airflow control device is capable of reversibly changing shape, dimension, orientation, location and/or stiffness, the change being effected through the activation of an active material, allowing the airflow control device to adapt to varying driving conditions. Employing the active materials as described herein advantageously provides an actuation mechanism that is lightweight, inherently robust, and lower in complexity than prior external actuation means. Moreover, the airflow control devices described herein are also of low cost and of easily adaptable design that may be integrated with limited changes to the existing structure. As used herein the term "vehicles" includes any structure subject to airflow including, but not intended to be limited to, automobiles, over the highway tractors, boats, motorcycles, airplanes, bobsleds, spaceship, and the like.

Figure 1:
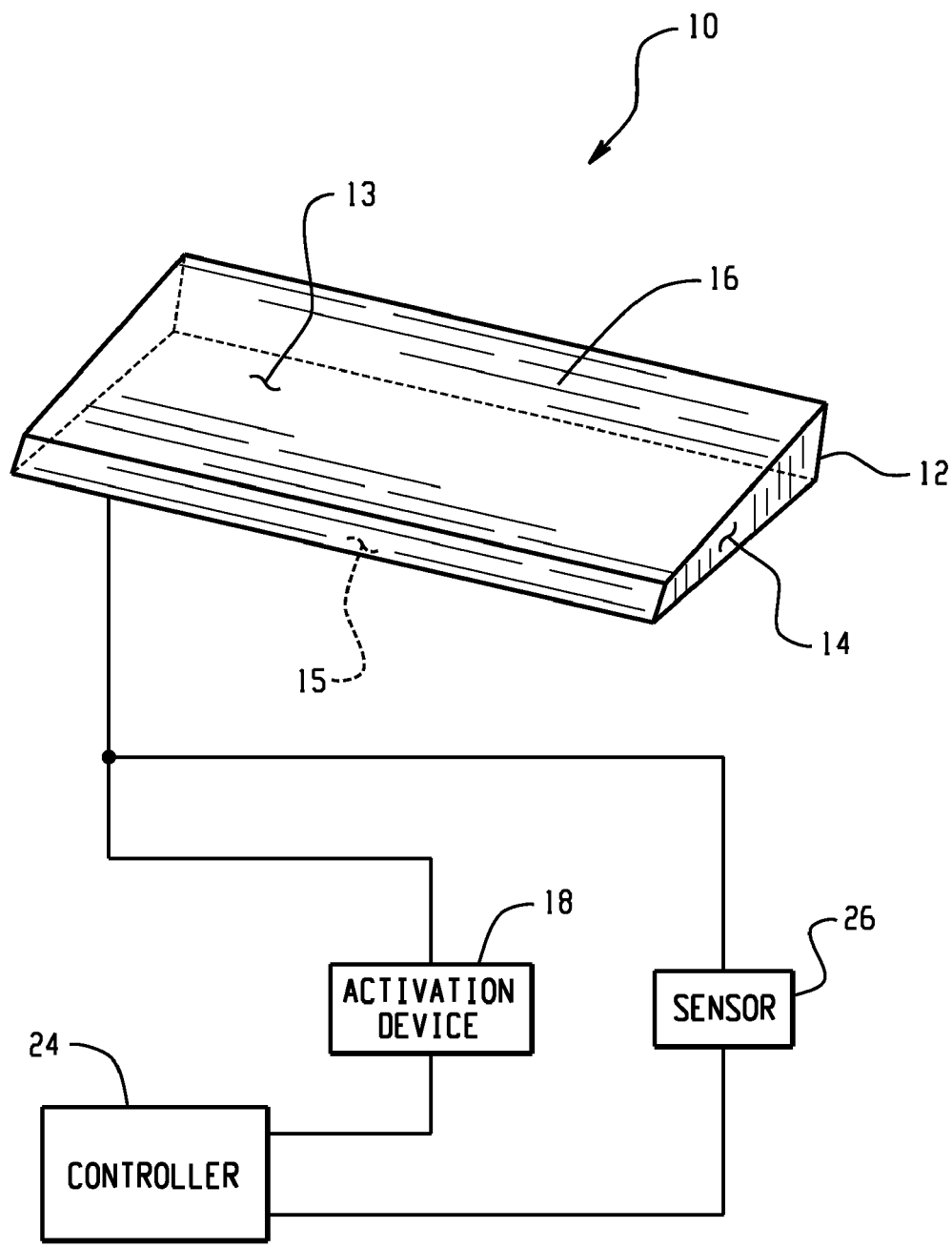
FIG. 1 is a perspective view of an airflow control device in accordance with the present disclosure.

As shown in FIG. 1, an airflow control device for a vehicle (also referred to herein as an air deflector), generally indicated as reference numeral 10, comprises a body portion 12 having at least one surface 13, 14, 15 and an active material 16 in operative communication with at least one surface 13, 14, 15 and/or the body 12, the active material 16 having a first at least one attribute that is operative to change in response to an activation signal 17 (FIG. 8) to the active material 16. An attribute of the active material 16, and changes thereof, refer to characteristics of the active material 16 such as, but not limited to, shape, dimension, stiffness, combinations thereof, and the like. The changes in at least one attribute of the active material 16 affect various features of the airflow device 10 such as, but not limited to, shape, dimension, location, orientation, stiffness, combinations thereof, and/or the like, resulting in a change in the airflow across the device 10. In this manner, the device 10 is adjustable and airflow across the device 10 changes with the change in at least one attribute of the active material 16 under varying driving conditions.

Using an automobile as an example, the airflow control device 10 may be of any of a variety of configurations, including but not limited to, air dams; fender flares; side skirt cribs; cabs; rear and tailgate spoilers; louvers for controlling airflow through radiator, other heat exchangers, the engine compartment, over the drive train and transmission; and air and wind deflectors for roof tops, sunroofs, vent windows; and like configurations. An exemplary air dam comprises a projection of the body shell underneath the front of the chassis of a vehicle and functions to reduce the amount of air turbulence and drag underneath the vehicle, as well as channels cooling air to the radiator. Further, many airflow control devices, and air deflectors in particular, improve vehicle stability and increase gas mileage. For example, at low speeds the air dam can be actively positioned so that additional ground clearance is provided, such as may be desired to clear speed bumps, provide curb clearance for parking, and the like. At higher speeds, the air dam can be actively positioned to divert the incoming airflow into the cooling system, or divert air about the vehicle to improve aerodynamics, improve vehicle stability, increase gas mileage, and the like. It will be understood that the device 10 may be a portion of a vehicle louver system and/or an independent component of the vehicle.

The body 12 (also referred to herein as an air deflecting body) may be any of a variety of materials and configurations that enable the airflow device 10 to function, and may further comprise at least one surface 13, 14, or 15. In one embodiment, the body 12 is comprised of a flexible material that exhibits adequate flexibility to operate as an adjustable airflow control device as the active material 16 changes at least one attribute. In an additional embodiment, the body 12 may comprise one or more active material 16. The active material 16 may change at least one attribute in response to an activation signal, and revert back to the original state of the at least one attribute upon discontinuation of the activation signal, or, for the classes of active materials that do not automatically revert upon discontinuation of the activation signal, alternative means can be employed to revert the active materials to their original state as will be discussed in detail herein. In this manner, the airflow control device 10 functions to adjust to changing driving conditions while increasing device simplicity and reducing the number of failure modes.

Active material 16 includes those compositions that can exhibit a change in stiffness properties, shape and/or dimensions in response to the activation signal, which can take the type for different active materials 16, of electrical, magnetic, thermal and like fields. Preferred active materials 16 include but are not limited to the class of shape memory materials, and combinations thereof. Shape memory materials generally refer to materials or compositions that have the ability to remember their original at least one attribute such as shape, which can subsequently be recalled by applying an external stimulus, as will be discussed in detail herein. As such, deformation from the original shape is a temporary condition. In this manner, shape memory materials can change to the trained shape in response to an activation signal. Exemplary active materials include shape memory alloys (SMA), shape memory polymers (SMP), electroactive polymers (EAP), ferromagnetic SMAs, electrorheological fluids (ER), magnetorheological fluids (MR), dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called martensite and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials 16 that exhibit an intrinsic shape memory effect are fabricated from a shape memory alloy composition that will cause the active materials 16 to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials 16 that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the airflow control devices with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Shape memory polymers (SMP's) are known in the art and generally refer to a group of polymeric materials that demonstrate the ability to return to some previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment.

Figure 2A:
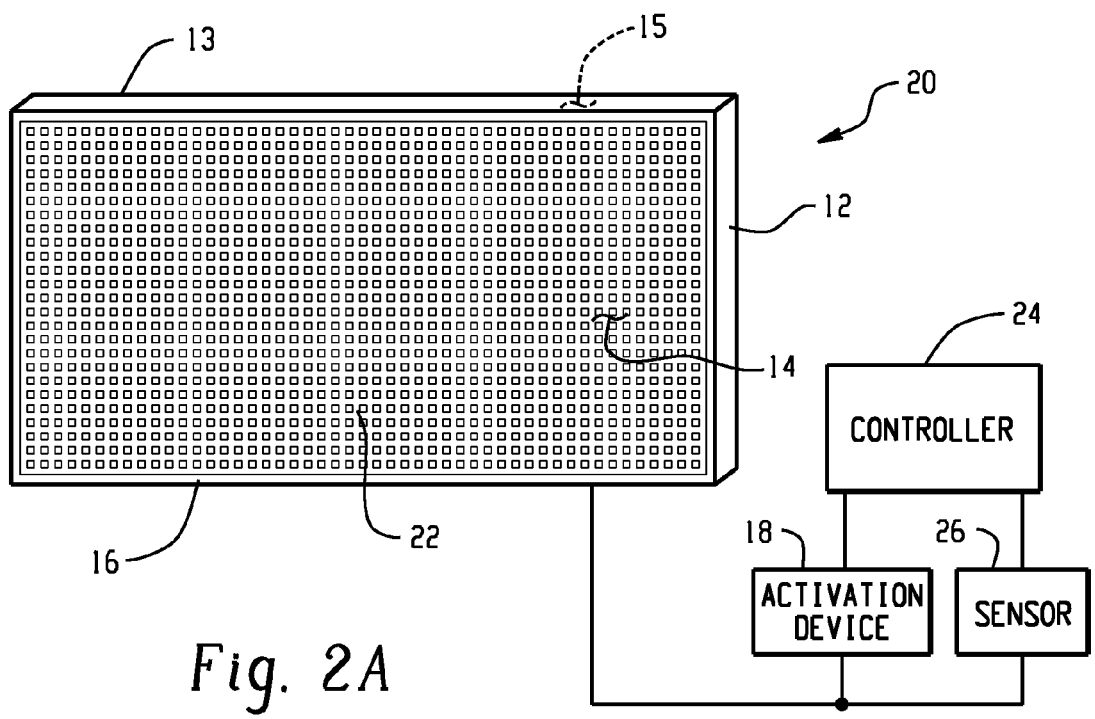
FIGS. 2a and 2b are perspective views of an airflow control device having an active material on a surface in accordance with the present disclosure.
Figure 2B:
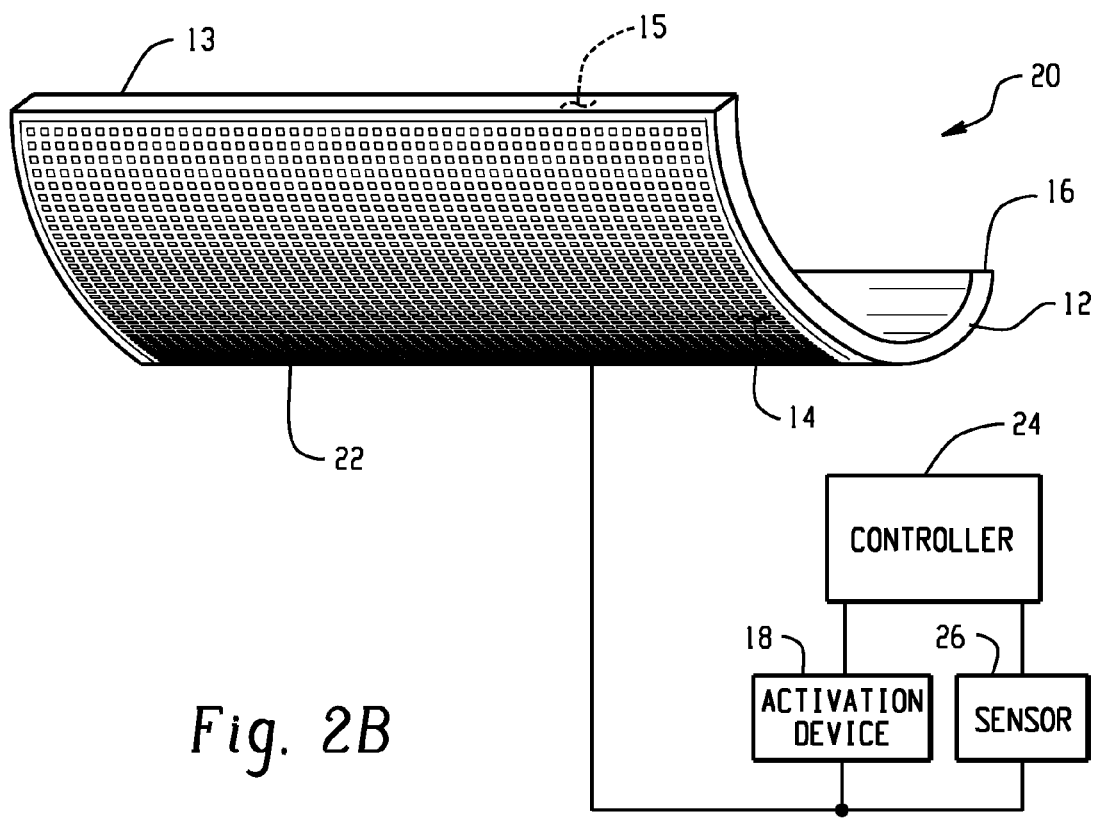

In a preferred embodiment, the permanent shape of the active material 16 is a substantially straightened shape and the temporary shape of the active material 16 is a curved shape (see FIGS. 2a-2b). In another embodiment, the shape memory polymer comprises two permanent shapes. In the first permanent shape the active materials 16 are in a substantially straightened shape and in the second permanent shape, the active materials 16 are in a curved shape.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, urethane block copolymers, styrene-butadiene-styrene block copolymers, and the like.

The active material 16 may also comprise an electroactive polymer such as ionic polymer metal composites, conductive polymers, piezoelectric material and the like. As used herein, the term "piezoelectric" is used to describe a material that mechanically deforms when a voltage potential is applied, or conversely, generates an electrical charge when mechanically deformed.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suit-able piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

The airflow control device 10, illustrated in FIG. 1, may comprise one or more of the above noted active materials 16 applied as a coating, a layer, and/or sections such as strips to at least one surface 13, 14, and/or 15 of the body 12. In one embodiment, different active materials are applied to a surface 13, 14, 15, wherein the different active materials 16 are applied adjacent to one another. In another embodiment, the active material 16 may comprise a composite of different shape memory materials. In either embodiment, the active material 16 provides the airflow device 10 with a shape changing capability that can be actively-tuned to a particular application, as will be described in greater detail.

Coupled to and in operative communication with airflow device 10 is an activation device 18. The activation device 18 is in functional communication with the airflow device 10 and/or active material 16, which is operable to selectively provide an activation signal to the airflow control device 10 and change a feature of the airflow device 10 by changing at least one attribute of the active material 16. For example, in the case of an underflow airflow device, the active material 16 can retract or extend the airflow device 10 depending on the speed of the vehicle. The activation device 18, on demand, provides the activation signal or stimulus to the active material 16 of the airflow device 10 to cause the change in one or more feature of at least a portion of the device 10. In one embodiment, the change in feature generally remains for the duration of the applied activation signal. Upon discontinuation of the activation signal, the active material 16 generally reverts to an unpowered form and returns substantially to the original at least one attribute, thus reverting the airflow device 10 to the original feature and/or features. In another embodiment, the change in one or more attribute of the active material 16 and/or feature of at least a portion of the device 10 may remain upon discontinuing the activation signal. In this embodiment, the device 10 includes a means to maintain the change in active material 16, such as a latch, lock, stop and/or the like. Upon release of the means, the device 10 reverts back to the original at least one feature. The illustrated device 10 is exemplary only and is not intended to be limited to any particular shape, size, dimension or configuration, material, or the like.

In another embodiment, the airflow device 10 includes at least one sensor 26 in operative communication with the airflow control device 10 and/or the active material 16, wherein the sensor is adapted to transmit signals indicative of at least one vehicle condition. This embodiment may further comprise a controller 24 that is operatively connected to the sensor 26 and activation device 18, wherein the controller is programmed and configured to cause the activation device 18 to provide an activation signal to the active material 16 when the sensor 26 signals indicate a predetermined vehicle condition.

The present disclosure is not intended to be limited to any particular activation signal. The particular activation signal will depend on the sensitivity of the active material 16. As such, the activation signal may provide a thermal activation signal, magnetic activation signal, electrical activation signal, chemical activation signal, and/or other like activation signal or combination of activation signals.

As shown in FIGS. 2a and 2b, perspective views of an airflow control device designated as reference numeral 20, an airflow device 20 may comprise one or more surfaces 13, 14, 15 to control airflow. In one embodiment, the body 12 of the airflow device 20 may be comprised of a suitable active material 16. In another embodiment, the body 12 may comprise active material 16 or other suitable compositions, having one or more surfaces 13, 14, 15 comprising one or more active materials 16. The active materials 16 in this device 20 as shown in FIG. 2a, may have a substantially straight shape at room temperature and, as show in FIG. 2b, a curved shape (i.e. curvilinear shape) when heated above a temperature range that may be generally encountered during vehicle operation. In this view, the airflow device 20 may control airflow while maintaining sufficient ground clearance to avoid contact with and damage by road hazards and inclement weather residue. In this embodiment, the active material is preferably selected to be sensitive to thermal activation.

As shown, one of more wires 22 are embedded in the active material 16 of the device 20 to provide a thermal activation means in the form of resistive heating. In additional embodiments, controls such as controller 24 and/or sensor 26 may cause a current to flow through the embedded wires 22 at low driving speed causing the active material 16 to curve upward, assuming a trained higher temperature shape. This may result in a rise in the airflow control device 20 and in doing so increase vehicle ground clearance. Further, when driving above a predetermined speed, the controller 24 may discontinue the current and allow the airflow control device 20 to cool, thus straighten and deploy. In another embodiment, the change in feature may be reversed such that at higher vehicle speeds heating may be employed to achieve a high temperature shape, and current would be discontinued at lower vehicle speed to achieve a low temperature shape. In another embodiment, the change in one or more attribute of the active material 16 and/or feature of the device 10 may remain upon discontinuing the activation signal. In this embodiment, the device 10 includes a means to maintain the change in active material 16, such as a latch, lock, stop and/or the like. Upon release of the means to maintain the change in active material 16, the device 10 reverts back to the original at least one feature. In this manner, the device 20 may curve upward in response to the activation signal, maintain the upward curve until release of the means, where upon the device 20 will revert and straighten. Further, the airflow control device 20 that becomes deformed, such as during an impact, may be restored or healed to a desired shape by applying the appropriate temperature range. The selection of material comprising the body 12 and/or active material 16 will be determined by the desired application. Moreover, selection of the locking means is well within the skill of those in the art.

Figure 3A:
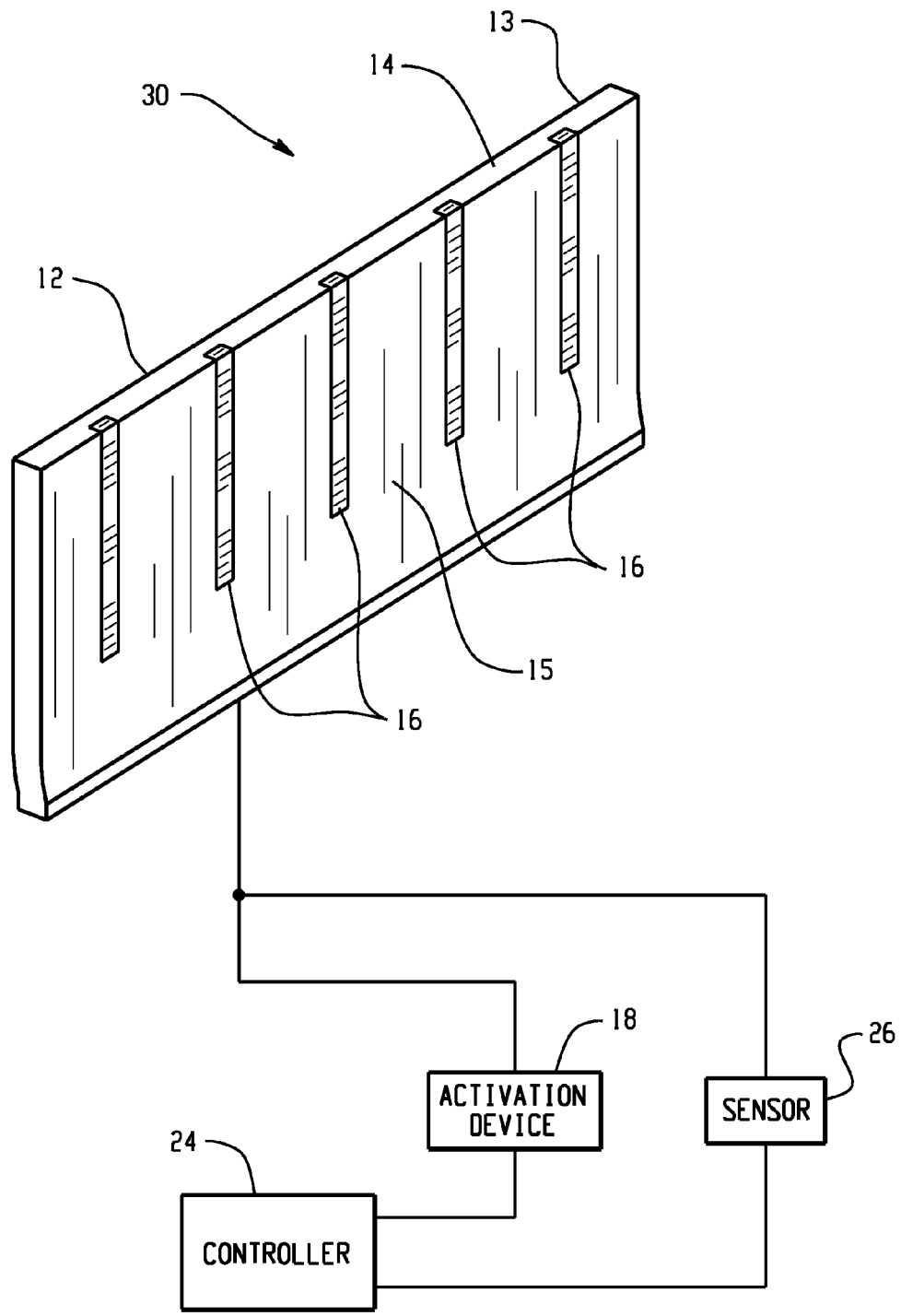
FIG. 3a is a perspective view of an airflow control device having active material embedded within a surface of the body in accordance with an embodiment of the present disclosure.
Figure 3B:
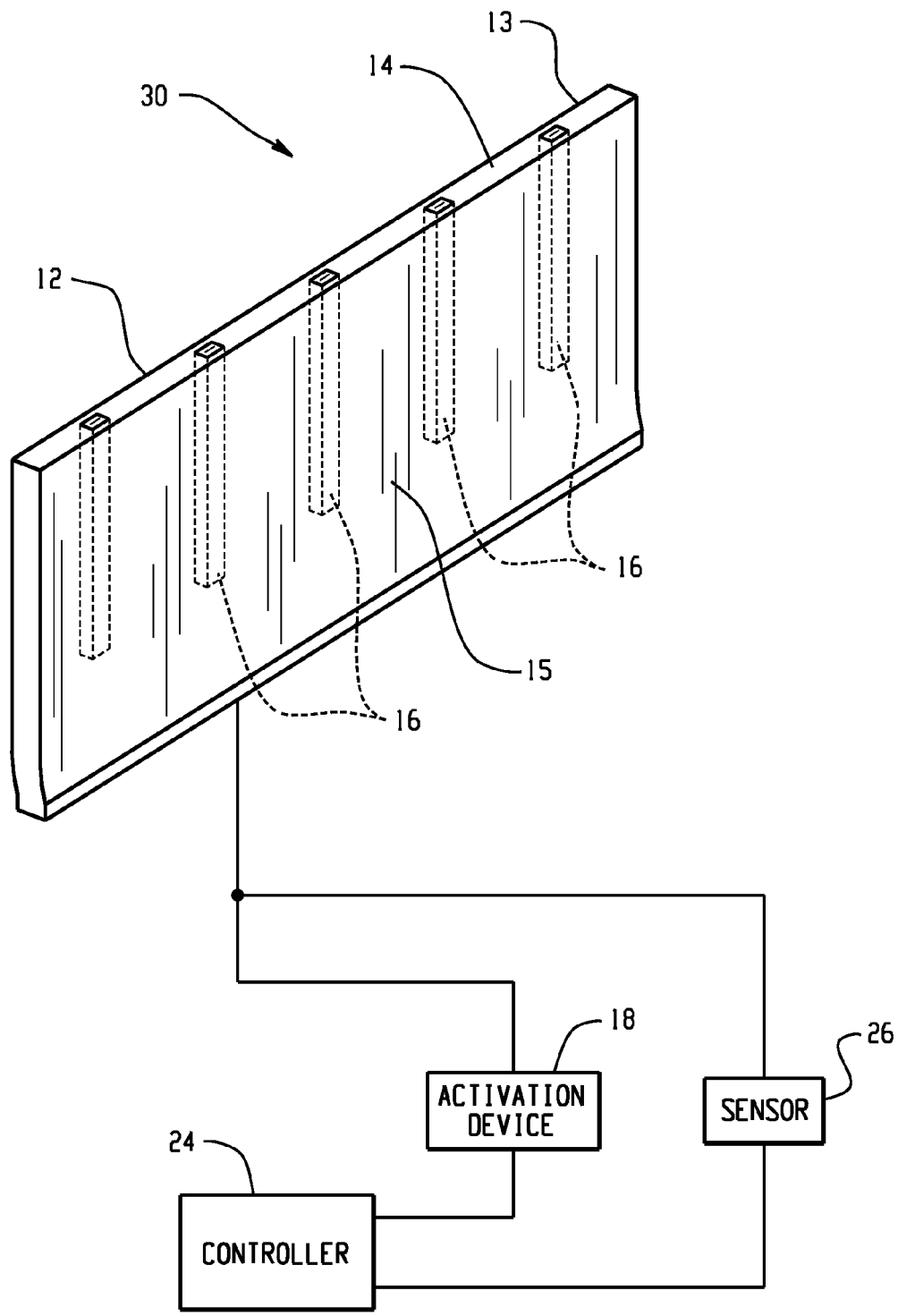
FIG. 3b is a perspective view of an airflow device having active material embedded within the body in accordance with an embodiment of the present disclosure.

As shown in FIGS. 3a and 3b, perspective views of an airflow control device designated as reference numeral 30, is shown, having strips and/or sections of active material 16. In FIG. 3a, the device 30 comprises strips and/or sections of active material 16 embedded on one or more surfaces 13, 14, 15, of the body 12. In an alternate view, shown in FIG. 3b, the strips and/or sections of active material 16 are embedded within the body 12 of the device 30. In this embodiment, the body 12 comprises a flexible matrix material with strips of active material 16, preferably but not necessarily, embedded at regular intervals. The placement of the active material 16 is not limited to any particular configuration or pattern and will be determined by the desired application of the device 30. In one embodiment, as in strips of SMA, the active material 16 has a trained curved shape in the austenite phase, not shown in this view. At standing or low vehicle speeds, the active material 16 may be activated such as by resistance heating which may cause the active material 16 to curve and in doing so curl the airflow control device 30 up and out of the external airflow. The change in shape may be initiated by an activation signal transmitted by activation device 18, controller 24, and/or sensor 26.

With regard to SMAs, as a result of the change in phase, the stiffness in the austenite phase will be greater than the stiffness in the martensite phase. The number and size of the embedded active material strips may be chosen such that when in the austenite phase the embedded active material 16 causes the bulk of the airflow control device 30 to deform. However, when the active material 16 is in the martensite phase, the flexible material comprising the bulk of the airflow control device 30 is sufficiently stiff to return the device 30 to a straight, deployed configuration, and in doing so straightening the active material 16. At higher speeds, in excess of a predetermined vehicle speed, the current flow causing resistant heating may be stopped, causing the active material 16 to return to the martensite phase. In this manner, the airflow control device 30 reverts to a straightened deployed state. As previously discussed, the airflow control device 30 may be restored if deformed as a result of force, such as an impact, due to plastic deformation of the strips of active material 16 by heating the active material 16 to the austenite phase temperature. The other active materials noted above can be activated in a similar manner using a suitable activation signal particular to the selected active material as will be appreciated by those skilled in the art in view of this disclosure.

In an additional embodiment, shown in FIG. 4, a perspective view of an airflow control device 40 comprises active material 16 in the shape of helical springs positioned in functional operation to the body 12 of the airflow control device 40. In this embodiment, the active material 16 may be connected externally either directly or remotely to a surface 13, 14, 15 of the airflow control device 40. As shown in FIG. 4, a surface 13 of the body 12 is coupled with a tube 42 in such a fashion that the tube 42 is free to rotate about its axis. A spring mechanism 44 and the active material 16 are both coupled to the tube 42 in an opposing fashion such that their respective tensions balance each other. In this manner, the rotation of the tube 42 through external means may increase the tension in one while reducing tension in the other. At low vehicle speeds (i.e., less than a predetermined speed), tension in the spring mechanism 44 combined with reduced stiffness and greater length of an unheated active material 16 results in rotation of the airflow control device 40 out of the airflow. At higher speed (i.e., greater than the predetermined speed), the temperature of the active material 16 is raised through resistance heating to produce a phase change in the active material 16 from the martensite phase to the austenite phase. The wires comprised of active material 16 preferably exhibit up to about a 4 percent (%) reduction in length with an up to 3 times increase in stiffness properties. In this manner, the combined reduction in length and increase in stiffness properties can result in deployment of the airflow control device 40, e.g., such as rotation of the tube 42 and stretching of the counterbalancing spring mechanism 44. Upon discontinuation of the resistance heating, the active material 16 cools to the martensite phase and the stretched spring mechanism 44 can be used to return the airflow control device 40 to a stowed position. In another embodiment, the change in one or more attribute of the active material 16 and/or feature of the device 10 may remain upon discontinuing the activation signal. In this embodiment, the device 10 includes a means to maintain the change in active material 16, such as a latch, lock, stop and/or the like. Upon release of the means to maintain the change in active material 16, the device 10 reverts back to the original at least one feature. As previously discussed, the activation device 18, controller 24 and/or sensor 26 may function with each other and the airflow control device 40 to initiate the changes in at least one attribute of the active material 16.

Figure 6:
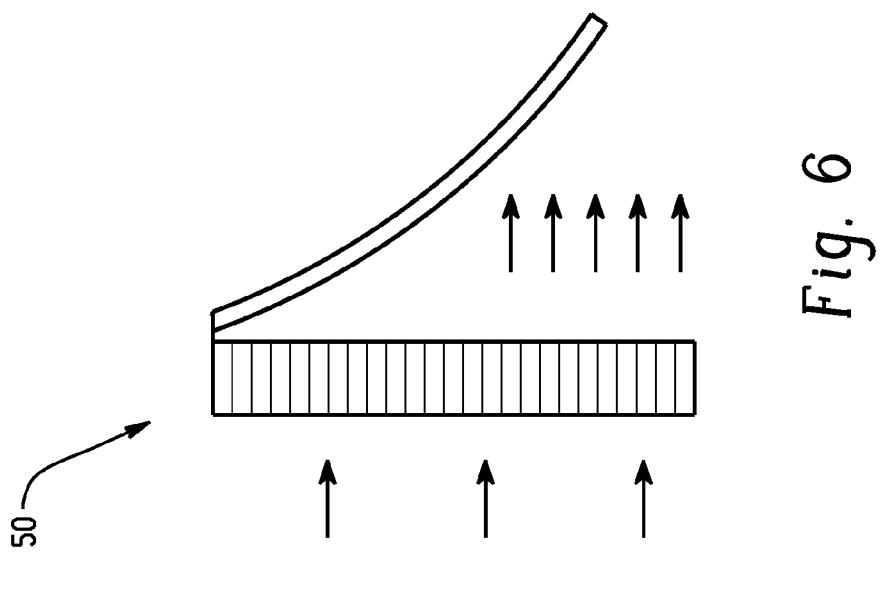
FIG. 6 is a side view of the airflow control device of FIG. 5.
Figure 5:
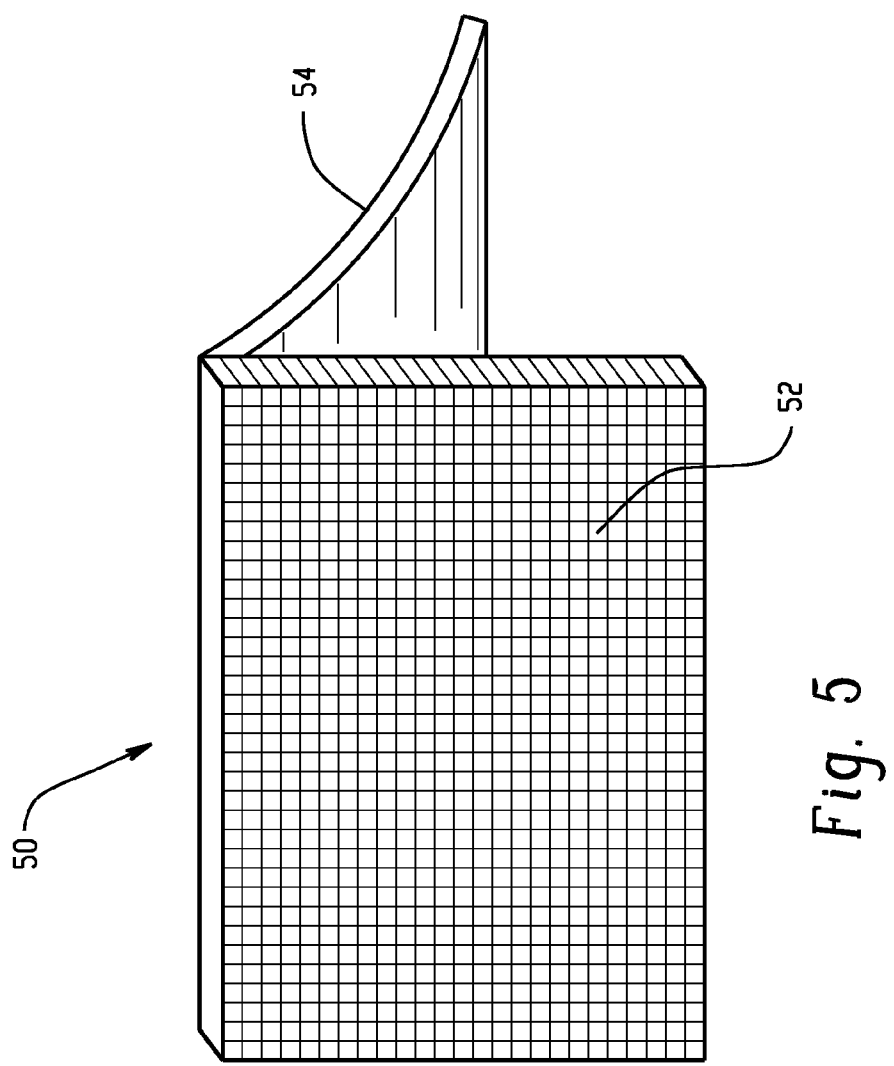
FIG. 5 is a perspective view of an airflow control device in accordance with an embodiment of the present disclosure.

In another embodiment as shown in FIGS. 5 and 6, an airflow control device 50 comprises an active material adapted to selectively change its flexural modulus, which is utilized to regulate airflow through and about the device. The device 50 comprises a flap 54 formed of an active material. For example, the flap 54 may comprise a shape memory polymer. In one embodiment, the memorized shape of the shape memory polymer would be arranged so as to occlude or present a reasonable cross-section to the incident airflow. Embedded within the shape memory polymer is some means to raise the temperature of the polymer. One of many possible heating elements may be a high resistance flexible metal grid 52. When the shape memory polymer flap 54 is in the stiff state (i.e. below the glass transition temperature for the shape memory polymer) it will elastically oppose the force of the incident flow, as long as the flow is below a critical flow rate. When switched to the soft state through heating, the stiffness of the material will change, resulting in a change in the stiffness of the air diverting structure. This change in stiffness may be tailored through geometrical means or by compositional formulation. As a result, the ability of the structure to oppose the incident flow may be significantly and intentionally reduced such that the structure bends and flow is redirected. This effect can also be used to increase the distance between the ground and the air deflector, thus reducing the risk of collision with low lying obstacles. This effect will occur above a threshold flow rate. In the case of shape memory polymers with one-way shape memory, once the structure is in the soft state it will not be able to return to the initial configuration unless the incident flow is reduced significantly. However, when the airflow is reduced, the shape memory polymer will return to the original configuration. As an additional capability, the shape memory polymer can reduce or repair damage incurred through impacts with road debris or parking structures through the same mechanism that allows selective diversion of airflow.

Other active material structures may also be used in this manner, such as elastic structures that can be stiffened or weakened through the activation of magnetorheological fluids or rubbers, or electrorheological fluids. In these embodiments, the materials undergo a dynamic change in stiffness upon activation, but generally do not exhibit a significant force upon return to their initial configuration. Example embodiments utilizing these materials include a parallel set of soft elastomer tubes filled with magnetorheological fluids might that can be used to form the body of the airflow control device.

For activation, magnetizing coils would be wrapped around each tube. When activated through the action of a current through the coils, the viscosity of the magnetorheological fluid increases dramatically. Magnetorheological rubber materials can be used in a similar configuration, although the changes in stiffness for these materials are significantly lower. In either embodiment, the structure becomes stiff and more able to oppose the incident airflow. Similarly, a pair of flexible conducting sheets (for instance, graphite impregnated elastomer) separated by a layer of electrorheological fluids could act as a variable stiffness structure. When activated, the electrorheological fluid becomes a gel that stiffly binds the two sheets, dramatically increasing the dynamic stiffness of the structure.

Optionally, a shape memory alloy may be used to provide selectively variable stiffness modulation. In this embodiment, the airflow control device is stiff above the austenite finish temperature and soft and highly deformable below the martensite finish temperature for the shape memory alloy to variably change the incident airflow path. The shape memory alloy may be in the form of a thin sheet, foil, mesh grid, or the like. Hence, to oppose the flow, the shape memory alloy must be heated, and to allow flow past the diverter, the shape memory alloy must be allowed to cool. Depending on temperature, therefore, the shape memory alloy will either resist or allow the incident airflow to flow past the airflow control device.

Figure 8:
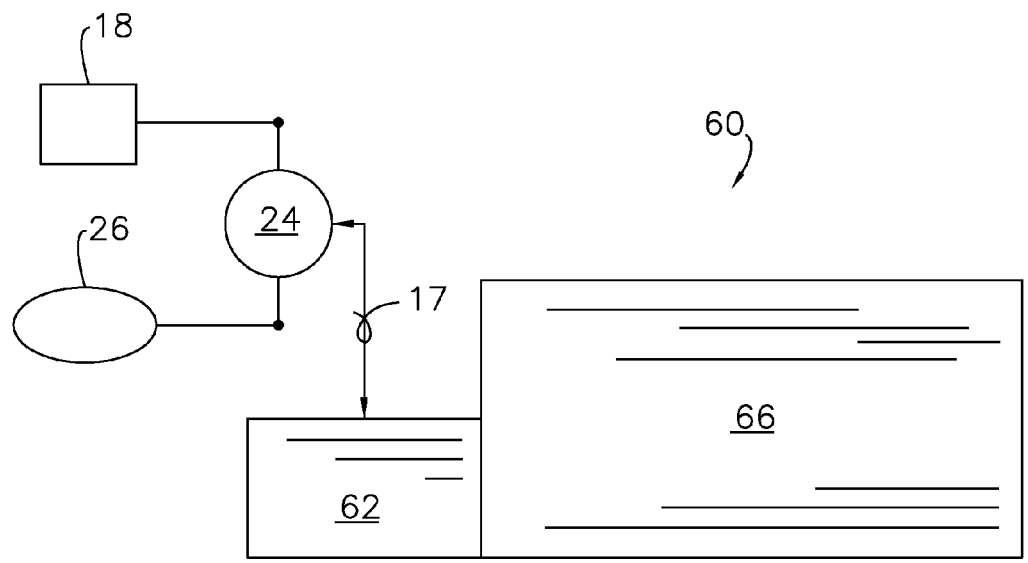
FIG. 8 is a side view of the airflow control device of FIG. 7.
Figure 7:
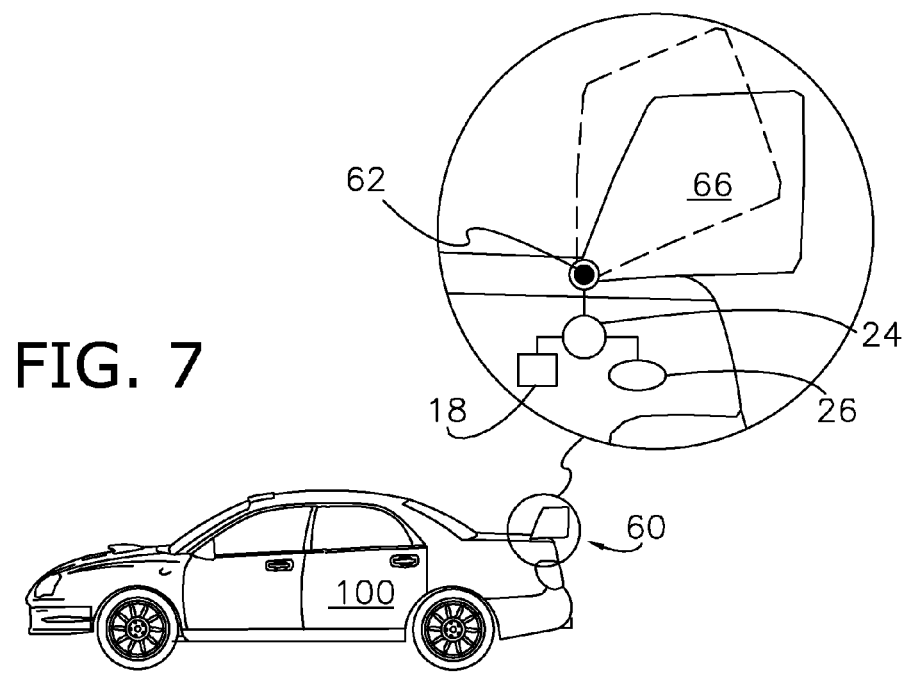
FIG. 7 is a front plan view of an airflow control device in accordance with an embodiment of the present disclosure.

In another embodiment as shown in FIGS. 7 and 8, an airflow control device 60 comprises an active material 62 that functions as a hinge. In this case, a rigid air diverter flap 66 is operably connected to a stationary surface of the vehicle. For the case of a SMP hinge (i.e., 62), activation of the hinge by increasing the temperature above the transition temperature will allow the diverter flap 66 to rotate easily in response to air flow, which can be used to change the direction of an incoming air stream. In contrast, by cooling the shape memory polymer below the transition temperature, the flap can be locked into the current position, wherein the original position may be obtained by heating the polymer above the transition temperature without an incoming air stream. Similar functionality can be achieved using a shape memory alloy hinge, wherein the martensite phase provides rotation due to its lower modulus whereas in the austenite phase, the hinge 62 becomes stiff and does not permit rotation. In contrast to the shape memory polymer hinge, heating the shape memory alloy hinge into austenite phase will force a recovery into the trained shape and thus could also serve as actuation for the flap.

Methods of controlling vehicle airflow are disclosed. In one embodiment, the method first comprises positioning the airflow controlling device of any one of or combination of the preceding embodiments, e.g., devices 10, 20, 30, 40, 50, 60 so as to provide airflow in contact during movement of the vehicle, the airflow controlling device comprising a body and an active material in operative communication with the body, wherein the active material is operative to change at least one attribute in response to an activation signal. Once positioned, an activation signal is selectively introduced to the active material. By selectively introducing the activation signal, the at least one attribute of the active material changes.

In another embodiment, the method includes discontinuing the activation signal to reverse the change of at least one attribute of the active material. In an additional embodiment, the method includes maintaining the change in at least one attribute of the active material upon discontinuation of the activation signal.

Other embodiments include optimizing the power requirements for transitioning between well as occupying the various operational states. In general, the occupancy of the operation state is achieved through activation of the active material, which is maintained by applying sufficient power to maintain the transformation of the material. For example, in the shape memory alloy material this implies that the shape memory alloy components must be maintained above their phase transformation temperature. In the case of piezoelectric materials, sufficient voltage must be applied to maintain the desired deformation. This type of operation is referred to as power-on hold.

In order to obtain a power-off hold operation state (also referred to as a zero power hold operation state), whereby the activated state may be maintained without additional power, numerous different approaches are possible. These generally include using various external latching mechanisms to support the activated state, as well as incorporating a stiffness changing material, that may be "frozen" after deformation and used to maintain structural deformation.

The principal purpose of this latch is to allow for a zero power hold mechanism, but additional benefits are also accrued through the use of this latch. These additional benefits include a possibility to have the surface break away from the latched configuration due to impact with either a foreign object, or an increase in airflow volume above a prescribed rate.

Some possible approaches include a magnetic system, whereby a permanent magnet can be engaged and disengaged to a ferromagnetic keeper by means of temporarily magnetizing the keeper. This approach is advantageous in that mechanical contact is not required and thus greater environmental robustness is expected. Another possible latch implementation is a spring-loaded pin and acceptor assembly. In this case, the pin will slide into the acceptor under the force stored in a spring in series with the pin. A electromagnetic solenoid actuator, or shape memory alloy spring could be used to disengage the pin, and therefore release the structure. An additional latch scenario would be a combination of magnetic and active materials approaches whereby a permanent magnet attaches to a ferromagnetic keeper, and the keeper may be disengaged from the permanent magnet using an active materials based approach. Shape memory alloy wires or helical springs could be used to obtain this type of functionality. This system is advantageous over the purely magnetic approach in that the greater actuation energy density of active materials as compared to electromagnetic actuation allows for compact latch designs to be created, and miniaturization of this concept.

An exemplary zero power hold mechanism is illustrated in FIG. 9. The latch 80 comprises a permanent magnet 82 distally disposed on or integrated into an arm 84 extending from a body 86 that is fixedly attached to the airflow control device, e.g., device 60. During use, the permanent magnet 82 can selective engage a ferromagnetic keeper 88 when in contact or in close proximity to the keeper to provide a power-off hold mechanism.

An alternative approach that provides similar functionality, without the use of additional external components is the incorporation of a shape memory polymer material into the architecture. This approach utilizes the "shape fixity" aspect of shape memory polymers. In this embodiment, the polymer may be softened, deformed into a new shape using the active material based actuation previously described and hardened. At this point, if the active component is relaxed, the deformation of the elastic component may be maintained by support of the shape memory polymer.

In addition to the use of shape memory polymers for power-off hold, it should be noted that numerous other materials can be used in a similar capacity. For instance, a bladder or tubule filled with a meltable component such as wax, may accomplish the same goals. Operationally, such a structure and system would function as described above for shape memory polymers. Thermoplastics and thermosets are also known to reduce their stiffness upon heating, and can "freeze" in place upon cooling.

The airflow control devices and methods of the present disclosure are able to selectively adjust features such as shape, dimension, stiffness, location, combinations thereof, and the like by changing the at least one attribute of active material 16 to match the needs of different driving conditions. Changes in at least one attribute of active material 16 include shape, dimension, stiffness, combinations thereof and the like. Utilizing active materials 16 to affect these changes provide devices of increased simplicity and robustness, while reducing the number of failure modes, device volume and energy requirements for activation due to higher energy densities.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An air deflector 60 adapted for external use with a vehicle, and to modify an airflow and thus a resulting driving condition of the vehicle, said deflector comprising:
    a hinge made from an active material 62 fixedly connected to the vehicle and adapted to hingingly communicate with a stationary surface, wherein the active material 62 is adapted to change a flexural modulus property in response to an activation signal 17; and
    a rigid flap 66 hingingly attached to the vehicle, via the hinge made from the active material.

2. The air deflector 60 of claim 1, wherein the active material 62 comprises a shape memory alloy, a shape memory polymer, an electroactive polymer, magnetorheological elastomer, piezoelectric material or combinations comprising at least one of the foregoing materials.

3. The air deflector 60 of claim 1, wherein the active material 62 is a sheet, foil, or strip.

4. The air deflector 60 of claim 1, wherein the activation signal 17 comprises a thermal activation signal, an electrical activation signal, magnetic signal or a combination comprising at least one of the foregoing signals.

5. The air deflector 60 of claim 1, further comprising an activation device 18 adapted to provide an activation signal 17 to the air deflector 60.

6. The air deflector 60 of claim 1, further comprising at least one sensor 26 and a controller 24 in operative communication with the active material 62.

7. The air deflector 60 of claim 1, wherein the activation signal 17 is triggered by a predetermined speed of the vehicle 100, wherein the flexural modulus of the active material changes when a speed of the vehicle 100 exceeds the predetermined speed.

\* \* \* \* \*